(12) United States Patent
Athuraliya (10) Patent No.: US 10,798,594 B1
(45) Date of Patent: Oct. 6, 2020

(54) SYSTEMS AND METHODS FOR COMPUTING A SUSTAINABLE RATE FOR BROADCAST TRAFFIC IN A NETWORK

(71) Applicant: Harris Global Communications, Inc., Rochester, NY (US)

(72) Inventor: Sanjeewa Athuraliya, Brookwater (AU)

(73) Assignee: HARRIS GLOBAL COMMUNICATIONS, INC., Rochester, NY (US)

( * ) Notice: Subject to any disclaimer, the term of this patent is extended or adjusted under 35 U.S.C. 154(b) by 0 days.

(21) Appl. No.: 16/420,340

(22) Filed: May 23, 2019

(51) Int. Cl.
*H04W 24/04* (2009.01)
*H04W 24/08* (2009.01)
*H04W 84/18* (2009.01)

(52) U.S. Cl.
CPC ............ *H04W 24/04* (2013.01); *H04W 24/08* (2013.01); *H04W 84/18* (2013.01)

(58) Field of Classification Search
CPC .... H04W 24/04; H04W 24/08; H04L 12/413; H04B 10/0775
See application file for complete search history.

(56) References Cited

U.S. PATENT DOCUMENTS

| 7,693,051 | B2 | 4/2010 | Ozer et al. |
| 8,233,389 | B2 | 7/2012 | Yim et al. |
| 9,154,225 | B2 * | 10/2015 | Smith ................ H04B 10/0775 |
| 2013/0159021 | A1 * | 6/2013 | Felsher ............... G06F 21/6245 705/3 |
| 2019/0081884 | A1 * | 3/2019 | Spohn ................... H04L 41/12 |

OTHER PUBLICATIONS

Leguay, J., et al., "QoS Routing in OLSR with Several Classes of Service," PWN Mar. 2006.

* cited by examiner

*Primary Examiner* — Wei Zhao
(74) *Attorney, Agent, or Firm* — Fox Rothschild LLP; Robert J. Sacco; Carol E. Thorstad-Forsyth (57) ABSTRACT

Systems and methods for operating a network. The methods comprise: determining, by a first network node, a capacity of each communications link of a plurality of communications links on which the first network node is able to receive data from second network nodes; determining, by the first network node, a total number of network nodes that share the capacity of each said communications link of the plurality of communications links; computing, by the first network node, first data transmission rates for the plurality of communications links using the capacities and the total numbers of network nodes, respectively; comparing, by the first network node, the first data transmission rates to each other to determine which data transmission rate has a lowest value; and/or performing communication operations by the first network node in accordance with the data transmission rate determined to have the lowest value of the first data transmission rates.

34 Claims, 8 Drawing Sheets

SYSTEMS AND METHODS FOR COMPUTING A SUSTAINABLE RATE FOR BROADCAST TRAFFIC IN A NETWORK

BACKGROUND

Statement of the Technical Field

The present disclosure relates generally to networks. More particularly, the present disclosure relates to systems and methods for computing a sustainable rate for broadcast traffic in a network (e.g., an ad-hoc network).

Description of the Related Art

Mobile ad-hoc networks are known in the art. The mobile ad-hoc network is a wireless network that comprises a plurality of network nodes. The network nodes often have a mesh topology. The network nodes communicate with each other directly.

In military applications, the network nodes typically need to send and receive high priority broadcast packets with minimal packet loss and delay. The network nodes rely on the network to advise them of a specific data rate at which to send data onto the ad-hoc network. The network nodes adapt the rate of data transmission in accordance with the advised data rate. The network nodes have no other congestion control mechanisms.

SUMMARY

The present disclosure concerns implementing systems and methods for operating a network (e.g., an ad hoc network). The methods are described below with reference to a first network node and second network node(s). The use of the terms "first" and "second" is simply intended to distinguish one item from another, and is not intended to require a sequential order unless specifically stated.

The methods comprise: determining, by a first network node (e.g., a radio), a capacity of each communications link of a plurality of communications links (e.g., point-to-point communications links) on which the first network node is able to receive data from second network nodes; determining, by the first network node, a total number of network nodes that share the capacity of each said communications link of the plurality of communications links; computing, by the first network node, first data transmission rates for the plurality of communications links using the capacities and the total numbers of network nodes, respectively; comparing, by the first network node, the first data transmission rates to each other to determine which data transmission rate has a lowest value; and/or performing first communication operations by the first network node in accordance with the data transmission rate determined to have the lowest value of the first data transmission rates.

In some scenarios, the methods also involve determining whether the first network node received a second data transmission rate from one of the second network nodes within a given period of time. The data transmission rate is advertised to the second network nodes, when a determination is made that the first network node did not receive a second data transmission rate from one of the second network nodes within the given period of time. The second network nodes perform communication operations in accordance with the data transmission rate that was advertised by the first network node.

In those or other scenarios, the methods also involve: receiving by the first network node a second data transmission rate sent from one of the second network nodes; comparing the second data transmission rate to the data transmission rate determined to have the lowest value of said first data transmission rates; performing the first communications operations by the first network node in accordance with the data transmission rate when the second data transmission rate is greater than the data transmission rate; and/or performing second communications operations by the first network node in accordance with the second data transmission rate when the second data transmission rate is lower than the data transmission rate.

The present disclosure also concerns methods for operating a network node. The methods comprise: determining, by a first network node, a capacity of a communications link (e.g., a point-to-point communications link) on which the first network node is able to receive data from a second network node; determining, by the first network node, a total number of network nodes that share the capacity of the communications link; computing, by the first network node, a first data transmission rate for the communications link using the capacity and the total number of network nodes that share the capacity of the communications link; receiving, at the first network node, a second data transmission rate sent from the second network node or a third network node; comparing the first data transmission rate to the second data transmission rate; and performing communication operations by the first network node (A) in accordance with the first data transmission rate when results of the comparing indicate that the first data transmission rate is lower than the second data transmission rate, or (B) in accordance with the second data transmission rate when results of the comparing indicate that the first data transmission rate is greater than the second data transmission rate.

The present disclosure further concerns a method for operating a network (e.g., a multi-access link network). The methods comprise obtaining, by a network node, selector sets for a plurality of Multi-Point Relays ("MPRs") in the network. Each selector set comprises an identifier for a respective first MPR of the plurality of MPRs and identifiers for network nodes that are communicatively coupled to the respective first MPR via communications links without any intermediary network nodes. The methods also comprise: obtaining, by the network node, minimum capacities for the plurality of MPRs; computing, by the network node, data transmission rates using the selector sets and the minimum capacities, respectively; comparing the data transmission rates to each other to determine which data transmission rate has a lowest value; and performing communications operations by the network node in accordance with the data transmission rate determined to have the lowest value.

In some scenarios, the methods further comprise receiving by the network node a respective one of said minimum capacities along with a respective one of said selector sets from each of said MPRs. Each data transmission rate may comprise a ratio between a respective one of the minimum capacities and a total number of network nodes contained in a respective one of the selector sets.

In those or other scenarios, at least a first selector set of the selector sets comprises an identifier for a second MPR. The first selector set is expanded to include identifiers for network nodes that are communicatively coupled to the second MPR via communications links without any intermediary network nodes. A first data transmission rate of the data transmission rates comprises a ratio between a respective one of the minimum capacities and a total number of network nodes contained in the first selector set which has been expanded.

BRIEF DESCRIPTION OF THE DRAWINGS

The present solution will be described with reference to the following drawing figures, in which like numerals represent like items throughout the figures.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present solution may be embodied in other specific forms without departing from its spirit or essential characteristics. The described embodiments are to be considered in all respects only as illustrative and not restrictive. The scope of the present solution is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present solution should be or are in any single embodiment of the present solution. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One skilled in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

Reference throughout this specification to "one embodiment", "an embodiment", or similar language means that a particular feature, structure, or characteristic described in connection with the indicated embodiment is included in at least one embodiment of the present solution. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

In this document, when terms such "first" and "second" are used to modify a noun, such use is simply intended to distinguish one item from another, and is not intended to require a sequential order unless specifically stated.

The present solution generally concerns systems and methods for enabling a network node such that it can locally compute a sustainable data transmission rate for broadcast traffic in a network (e.g., an ad-hoc network) with minimal packet loss and delay. The broadcast traffic is sent from a given network node to all other network nodes. As such, the sustainable data transmission rate for broadcast traffic depends on a level of network traffic, the network topology and the data link capacities. All of these vary over time. Therefore, the present solution provides a dynamic mechanism to compute the sustainable data transmission rate. The dynamic mechanism requires extremely low overhead.

There are a number of conventional solutions for achieving minimal packet loss and delay. A first solution is a Quality of Service ("QoS") solution that is only able to prioritize the mission critical broadcast traffic over other less important traffic. In the absence of a congestion-responsive transport protocol (similar to Transmission Control Protocol ("TCP")) being used by the network nodes or knowledge of a sustainable data rate, the traffic prioritization could still lead to degraded service due to: a build-up of queues leading to increased packet delay and loss; and starvation of other less important traffic.

A second solution is an Off-Line Computation ("OLC") solution that sets the data transmission rate to a value at the extreme low end of possible data transmission rate values. The extreme low end value is defined by the following Mathematical Equation.

$$DTR = (\text{a lowest link speed in the network})/(\text{number of nodes in the network})$$

where DTR is the data transmission rate. Since the DTR does not adapt to the prevailing network topology, it leads to low network utilization, especially when the network is well connected or meshed.

A third solution employs a reactive on-demand routing protocol for the ad-hoc network. This protocol is implemented by all network nodes. In effect, each network node sets-up a traffic path to other network nodes that meets the required service level. This solution does not scale well since every node will perform a reactive on-demand data transmission rate computation by sending traffic.

The present solution overcomes the drawbacks of the above-mentioned conventional solution by determining a sustainable data transmission rate to be used by the network nodes. The present solution is described herein in relation to two types of networks, namely a point-to-point type of network and a multi-access type of network. In the point-to-point type of network, a point-to-point connections are employed. A point-to-point connection refers to a communications connection between two network nodes. The flow of broadcast traffic between two network nodes is influenced by the capacity of the connection between the two network nodes. In the multi-access type of network, multiple network nodes connect to the same multi-point transmission medium to transmit over it and share its capacity. The flow of broadcast traffic from a network node is influenced by the capacity of the weakest link among the links towards the network nodes connected to the same multi-point transmission medium. The present solution is not limited in this regard. The present solution can be used with any type of network.

In point-to-point type of networks, the present solution comprises: determining, by a first network node, a capacity of each communications link of a plurality of communications links (e.g., point-to-point communications links) on which the first network node is able to receive data from second network nodes; determining, by the first network node, a total number of network nodes that share the capacity of each said communications link of the plurality of communications links; computing, by the first network node, first data transmission rates for the plurality of communications links using the capacities and the total numbers of network nodes, respectively; comparing, by the first network node, the first data transmission rates to each other to determine which data transmission rate has a lowest value; and/or performing first communication operations by the first network node in accordance with the data transmission rate determined to have the lowest value of the first data transmission rates.

In some point-to-point type network scenarios, the present solution also involves determining whether the first network node received a second data transmission rate from one of the second network nodes within a given period of time. The data transmission rate is advertised to the second network nodes, when a determination is made that the first network node did not receive a second data transmission rate from one of the second network nodes within the given period of time. The second network nodes perform communication operations in accordance with the data transmission rate that was advertised by the first network node.

In those or other point-to-point type network scenarios, the present solution also involves: receiving by the first network node a second data transmission rate sent from one of the second network nodes; comparing the second data transmission rate to the data transmission rate determined to have the lowest value of said first data transmission rates; performing the first communications operations by the first network node in accordance with the data transmission rate when the second data transmission rate is greater than the data transmission rate; and/or performing second communications operations by the first network node in accordance with the second data transmission rate when the second data transmission rate is lower than the data transmission rate.

In multi-access type of networks, the present solution comprises obtaining, by a network node, selector sets for a plurality of MPRs in the network. Each selector set comprises an identifier for a respective first MPR of the plurality of MPRs and identifiers for network nodes that are communicatively coupled to the respective first MPR via communications links without any intermediary network nodes. The present solution also comprises: obtaining, by the network node, minimum capacities for the plurality of MPRs; computing, by the network node, data transmission rates using the selector sets and the minimum capacities, respectively; comparing the data transmission rates to each other to determine which data transmission rate has a lowest value; and performing communications operations by the network node in accordance with the data transmission rate determined to have the lowest value.

In some multi-access network scenarios, the present solution further comprises receiving by the network node a respective one of said minimum capacities along with a respective one of said selector sets from each of said MPRs. Each data transmission rate may comprise a ratio between a respective one of the minimum capacities and a total number of network nodes contained in a respective one of the selector sets.

In those or other multi-access network scenarios, at least a first selector set of the selector sets comprises an identifier for a second MPR. The first selector set is expanded to include identifiers for network nodes that are communicatively coupled to the second MPR via communications links without any intermediary network nodes. A first data transmission rate of the data transmission rates comprises a ratio between a respective one of the minimum capacities and a total number of network nodes contained in the first selector set which has been expanded.

Figure 1:
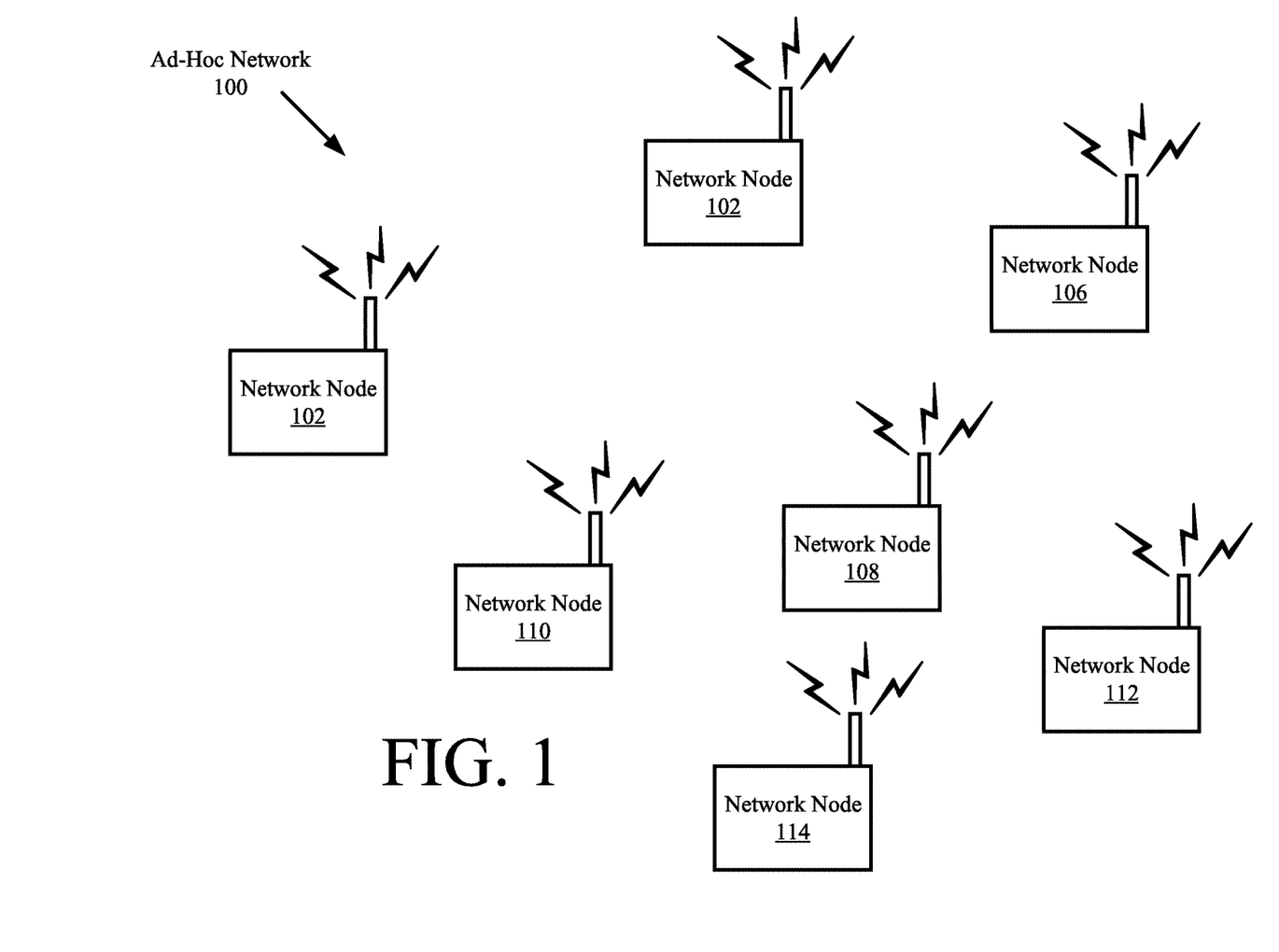
FIG. 1 is a perspective view of an illustrative system.

Referring now to FIG. 1, there is an illustration of an illustrative ad hoc network 100 implementing the present solution. Ad hoc network 100 comprises a plurality of network nodes 102-114. The network nodes 102-114 communicate with each other without the assistance of a router or base station. Network nodes may be added to or removed from the network at any time. In effect, temporary communication connections are provided between the network nodes. The ad hoc network 100 also does not have a fixed typology.

Figure 2:
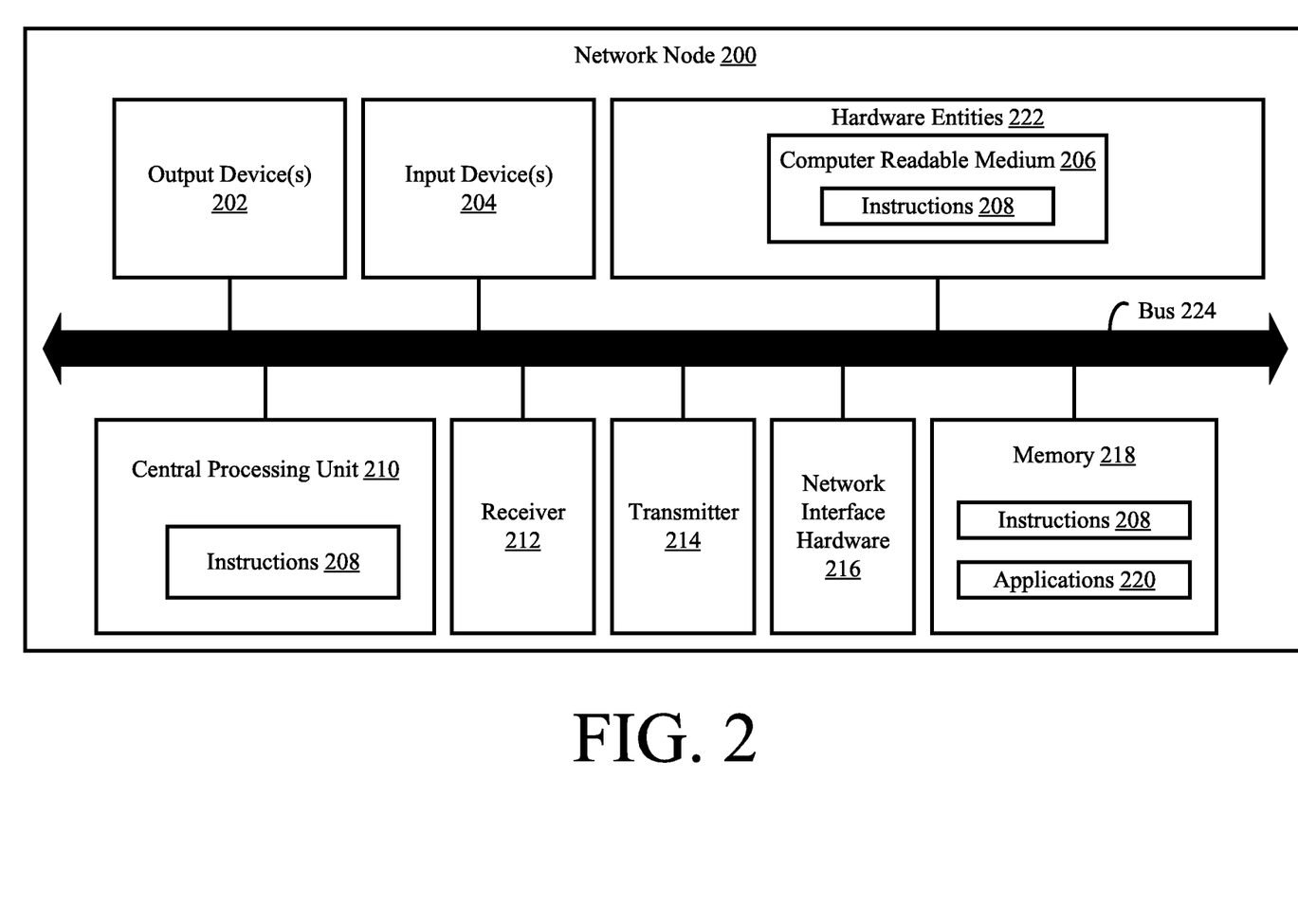
FIG. 2 is an illustration of an illustrative architecture for a network node.

Referring now to FIG. 2, there is provided an illustration of an illustrative architecture for a network node 200. Network nodes 102-114 of FIG. 1 can be the same as or similar to network node 200. As such, the discussion of network node 200 is sufficient for understanding network nodes 102-114 of FIG. 1.

Notably, the network node 200 may include more or less components than those shown in FIG. 2. However, the components shown are sufficient to disclose an illustrative embodiment implementing the present solution. The hardware architecture of FIG. 2 represents one embodiment of a representative network node configured to facilitate locally computing a sustainable rate for broadcast traffic in a network (e.g., an ad-hoc network). As such, the network node 200 of FIG. 2 implements at least a portion of the methods described herein.

Some or all the components of the network node 200 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

The network node 200 can include, but is not limited to, a radio. The network node 200 comprises a Central Processing Unit ("CPU") 210 and a memory 218, which communicate with each other via system bus 224.

Network node 200 also includes a transmitter 214 through which Radio Frequency ("RF") signals may be transmitted, and a receiver 212 through which RF signals can be received. In some scenarios, the network node 200 includes a transceiver in place of the receiver and transmitter, where the transceiver operates as both a transmitter and receiver.

One or more input devices 204 can be included in the network node 200, such as a keyboard and/or cursor control device. An output device 202 (such as a display screen) can be used to communicate information to the user concerning the operations and status of the network node 200. Input device(s) 204 and output device(s) 202 can communicate with CPU 210 through the system bus 224, but may also be connected by other interface and bus structures. Network interface hardware 216 can facilitate data communication operations with other data processing equipment to which the network node 200 is connected by wired or wireless means.

Hardware entities 222 include a computer-readable storage medium 206 on which is stored one or more sets of instructions 208 (e.g., software code) configured to implement one or more of the methodologies, procedures, or functions described herein. The instructions 208 can also reside, completely or at least partially, within memory 218 and/or within CPU 210 during execution thereof by network node 200. Memory 218 and/or CPU 210 also can constitute machine-readable media.

The term "computer-readable storage medium" shall be understood to include any medium that is capable of storing, encoding or carrying a set of instructions for execution by the machine and that cause the machine to perform any one or more of the methodologies of the present disclosure. The term "computer-readable medium" shall accordingly be taken to include, but not be limited to, solid-state memories such as a memory card or other package that houses one or more read-only (non-volatile) memories, random access memories, or other re-writable (volatile) memories; and/or magneto-optical or optical medium such as a disk or tape. Accordingly, the disclosure is considered to include any one or more of a computer-readable medium or a distribution medium, as listed herein and to include recognized equivalents and successor media, in which the software implementations herein are stored. Those skilled in the art will appreciate that the device architecture illustrated in FIG. 2 is one possible example of a network node. However, the present solution is not limited in this regard and any other suitable computing device architecture can also be used without limitation.

Dedicated hardware implementations including, but not limited to, application-specific integrated circuits, programmable logic arrays, and other hardware devices can likewise be constructed to implement the methods described herein. Applications that can include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the illustrative system is applicable to software, firmware, and hardware implementations.

In accordance with the present solution, the methods described below are stored as software programs in a computer-readable storage medium and are configured for running on a computer processor. Furthermore, software implementations can include, but are not limited to, distributed processing, component/object distributed processing, parallel processing, virtual machine processing, which can also be constructed to implement the methods described herein.

Figure 3:
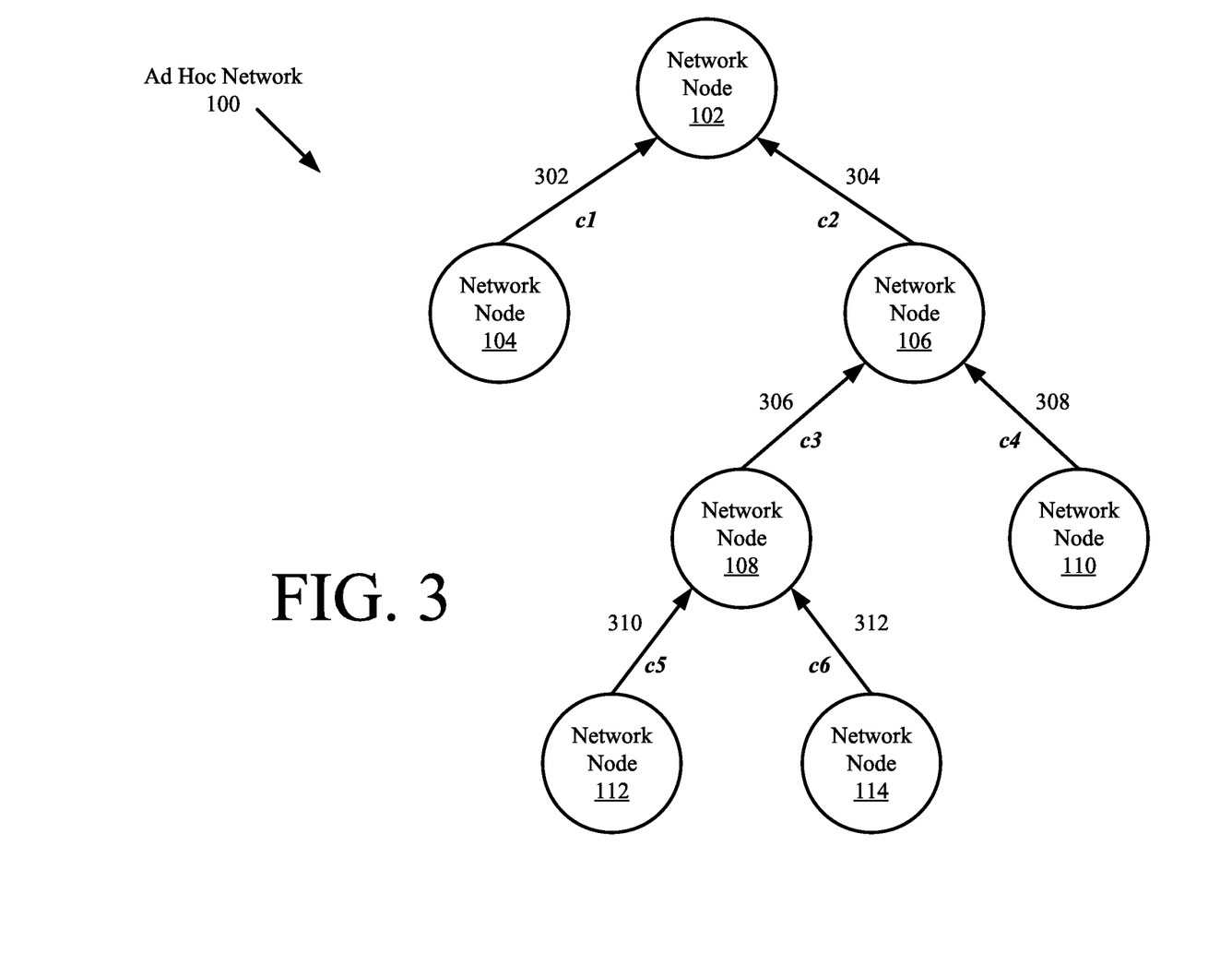
FIG. 3 is an illustration of the ad hoc network of FIG. 1 with a point-to-point network configuration.

Referring now to FIG. 3, there is provided an illustration of the ad hoc network 100 with a point-to-point network configuration. In accordance with the point-to-point network configuration, a first point-to-point communications link 302 is established between network node 104 and network node 102. A second point-to-point communications link 304 is established between network nodes 104, 106. A third point-to-point communications link 306 is established between network nodes 106, 108. A fourth point-to-point communications link 308 is established between network nodes 106, 110. A fifth point-to-point communications link 310 is established between network nodes 108, 112. A sixth point-to-point communications link 312 is established between network nodes 108, 114.

As shown in FIG. 3, network node 102 has two point-to-point communications links 302, 304 associated therewith. Only data from network node 104 is transmitted to network node 102 over point-to-point communications link 302. Thus, network node 102 does not share the capacity c/of with any other network node for data transmission to network node 102. In contrast, data from network nodes 106-114 is transmitted to network node 102 over point-to-point communications link 304. Therefore, five network nodes share the capacity $c_2$ of point-to-point communications link 304 for data transmissions to network node 102.

Network node 104 has one point-to-point communications link 302 associated therewith. Broadcast data from network nodes 102, 106-114 is received by network node 104 on point-to-point communications link 302. Thus, six network nodes share the capacity $c_1$ of point-to-point communications link 302 for broadcast data transmissions to network node 104.

Network node 106 has three point-to-point communications links 304, 306, 308 associated therewith. Broadcast data from network nodes 102, 104 is received by network node 106 on point-to-point communications link 304. Accordingly, two network nodes share the capacity $c_2$ of point-to-point communications link 304 for broadcast data transmission to network node 106. Broadcast data from network nodes 108, 112, 114 is received at network node 106 on point-to-point communications link 306. Thus, three network nodes share the capacity $c_3$ of point-to-point communications link 306 for broadcast data transmissions to network node 106. Broadcast data from network node 110 is received at network node 106 on point-to-point communications link 308. As such, network node 110 does not share the capacity $c_4$ of point-to-point communications link 308 with any other network node for broadcast data transmission to network node 106.

Network node 108 has three point-to-point communications links 306, 310, 312 associated therewith. Broadcast data sent from network nodes 102, 104, 106, 110 is received at to network node 108 on point-to-point communications link 306. Accordingly, four network nodes share the capacity $c_3$ of point-to-point communications link 306 for broadcast data transmission to network node 108. Broadcast data from network node 112 is received by network node 108 on point-to-point communications link 310. Thus, network node 110 does not share the capacity $c_5$ of point-to-point communications link 310 with any other network node for broadcast data transmission to network node 108. Broadcast data from network node 114 is received by network node 108 on point-to-point communications link 312. Thus, network node 114 does not share the capacity $c_6$ of point-topoint communications link 312 with any other network node for broadcast data transmission to network node 108.

Network node 110 has one point-to-point communications links 308 associated therewith. Broadcast data from network nodes 102-108, 112, 114 is received at network node 110 on point-to-point communications link 308. Thus, six network nodes share the capacity c4 of point-to-point communications link 308 with each other for data transmission to network node 110.

Network node 112 has one point-to-point communications links 310 associated therewith. Broadcast data from network nodes 102-110, 114 is received by network node 112 over point-to-point communications link 310. Thus, six network nodes share the capacity c5 of point-to-point communications link 310 with each other for broadcast data transmission to network node 112.

Network node 114 has one point-to-point communications links 312 associated therewith. Broadcast data from network nodes 102-112 is received by network node 114 on point-to-point communications link 312. Thus, six network nodes share the capacity c6 of point-to-point communications link 312 with each other for broadcast data transmission to network node 114.

Each network node 102-114 is configured to compute a data transmission rate for each of the point-to-point communications links associated therewith. The data transmission rate is related to the capacity of the respective point-to-point communications link and the number of network nodes sharing the point-to-point communications link. The data transmission rate computation for a given point-to-point communications link is defined by the following Mathematical Equation (1).

$$dtr_i = c_i/n \quad (1)$$

where $dtr_i$ represents the data transmission rate for the $i^{th}$ point-to-point communications link, $c_i$ represents the capacity of the $i^{th}$ point-to-point communications link, and n represents the number of network nodes that share the capacity of the $i^{th}$ point-to-point communications link for broadcast data transmissions to the same given node. As evident from Mathematical Equation (1), the data transmission rate $dtr_i$ is computed using distributed information gleaned from a routing table stored locally by each of the network nodes 102-114. This computation requires a proactive routing protocol to be implemented by the network nodes 102-114.

The following TABLE 1 shows the data transmission rate computations for the ad hoc network 100.

TABLE 1

| Network Node | Link | Capacity | Number of Nodes Sharing Capacity | dtr computation |
|---|---|---|---|---|
| 102 | 302 | c1 | 1 | dtr = c1/1 |
|  | 304 | c2 | 5 | dtr = c2/5 |
| 104 | 302 | c1 | 6 | dtr = c1/6 |
| 106 | 304 | c2 | 2 | dtr = c2/2 |
|  | 306 | c3 | 3 | dtr = c3/3 |
|  | 308 | c4 | 1 | dtr = c4/1 |
| 108 | 306 | c3 | 4 | dtr = c3/4 |
|  | 310 | c5 | 1 | dtr = c5/1 |
|  | 312 | c6 | 1 | dtr = c6/1 |
| 110 | 308 | c4 | 6 | dtr = c4/6 |
| 112 | 310 | c5 | 6 | dtr = c5/6 |
| 114 | 312 | c6 | 6 | dtr = c6/6 |

Once a network node completes its computation of the data transmission rate for all point-to-point communications links associated therewith, it compares the results to each other to identify which data transmission rate value is the lowest data transmission rate value $dtr_{lowest}$. The identified data transmission rate value $dtr_{lowest}$ is then advertised to all other network nodes in the ad hoc network 100 via a broadcast transmission, unless the network node became aware of a data transmission rate that was computed by another network node and is lower than all of its computed data transmission rates within a pre-configured period of time. As a result of the above described process, every network node 102-114 becomes aware of the worst (lowest) sustainable data transmission rate prevailing in the network. This data transmission rate, once adopted by the network nodes, will deliver minimal packet loss and delay for this high priority traffic within the prevailing network topology.

Figure 4A:
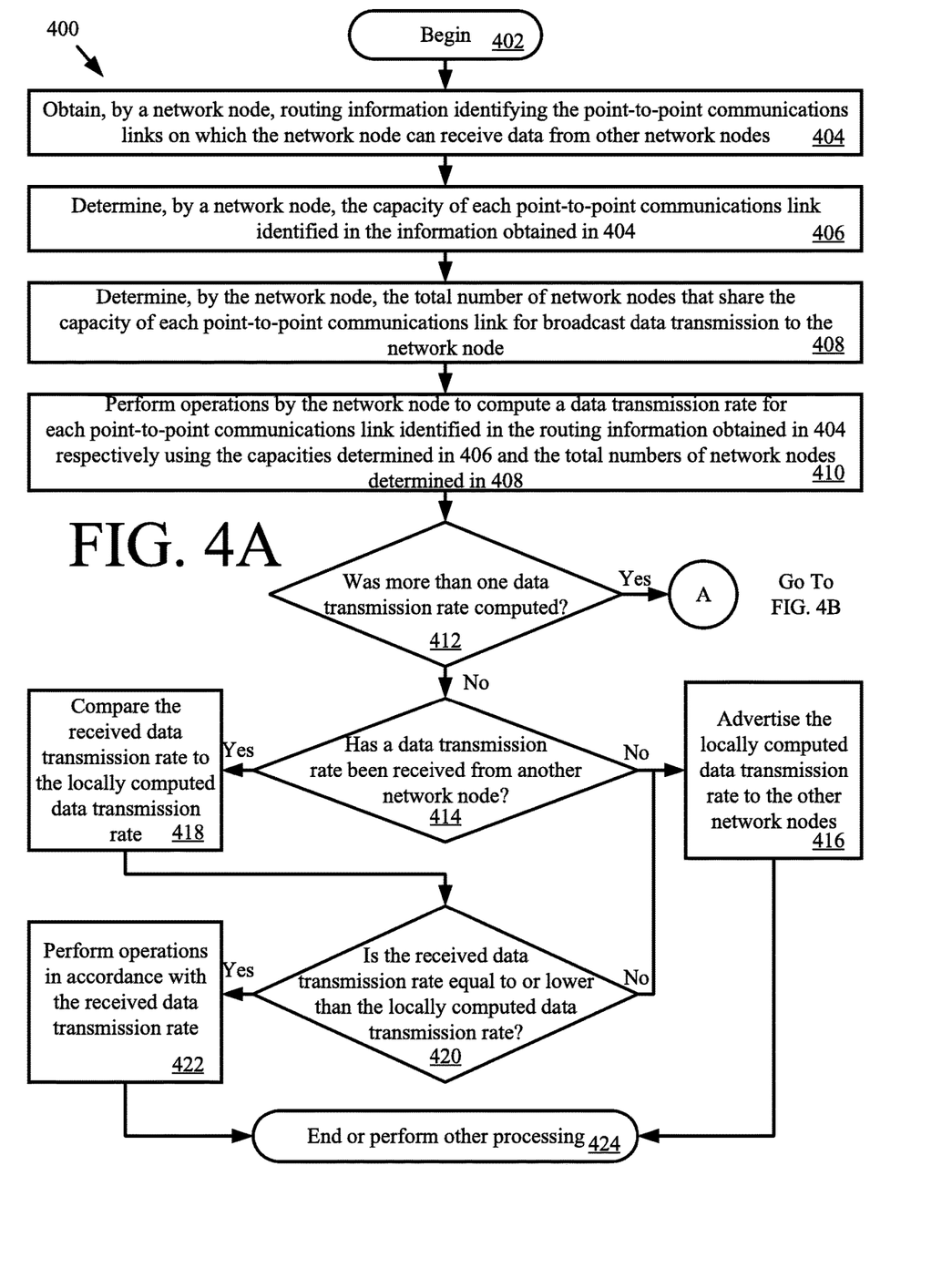
FIGS. 4A-4B ("collectively referred to as "FIG. 4") provides a flow diagram of an illustrative method for operating the ad hoc network with the point-to-point network configuration of FIG. 3.
Figure 4B:
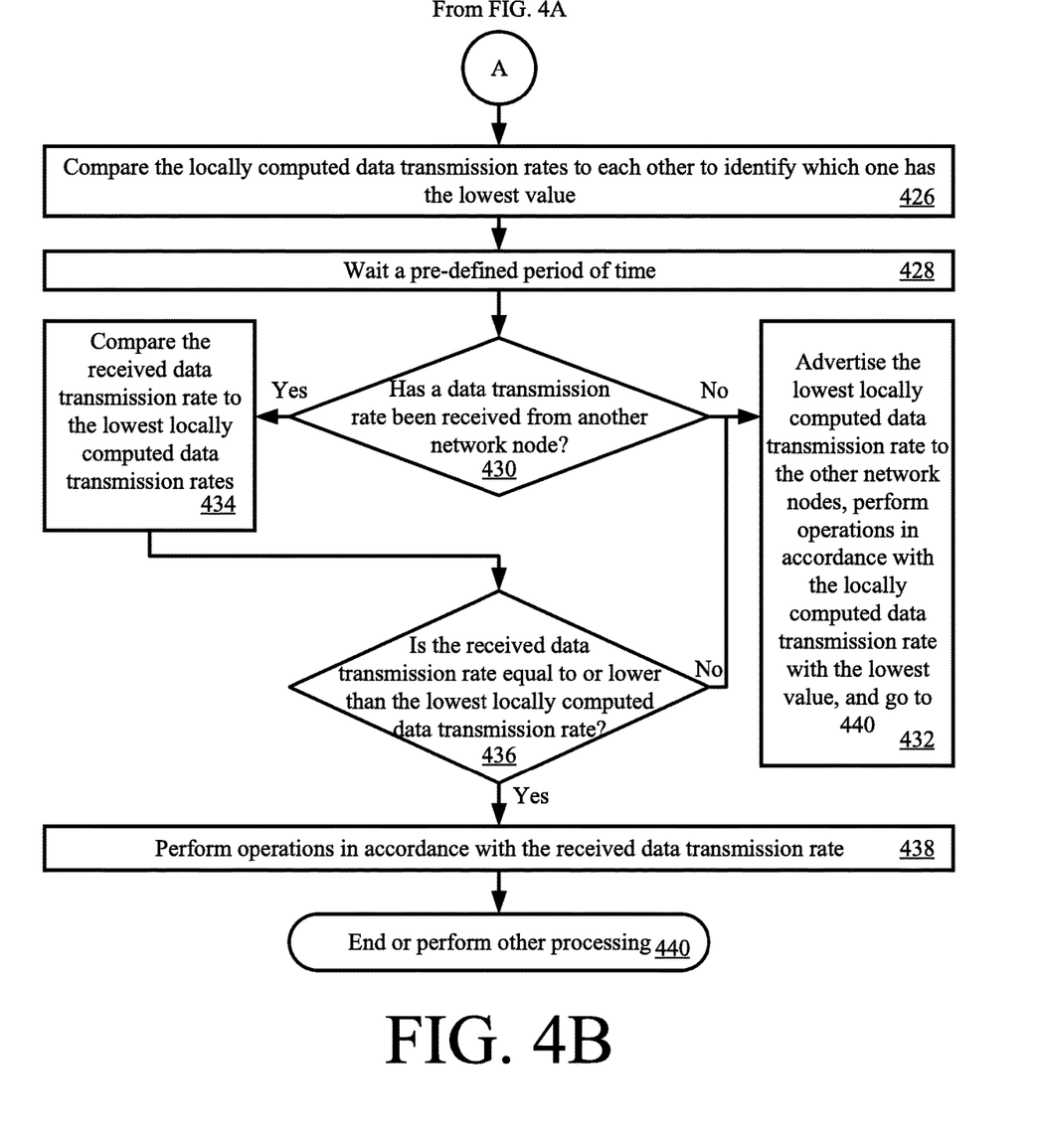

Referring now to FIG. 4, there is provided a flow diagram of an illustrative method 400 for operating the ad hoc network 100 with the point-to-point network configuration of FIG. 3. Method 400 may be performed each time a network node is added to the network, removed from the network, or a communications link failures occurs.

Method 400 begins with 402 and continues with 404 where a network node (e.g., network node 102 of FIGS. 1-3) obtains routing information identifying the point-to-point communications links (e.g., point-to-point communications links 302 and 304 of FIG. 3) on which the network node can receive data from other network nodes (e.g., network nodes 104-114 of FIGS. 1-3). This routing information can be contained in a pre-stored routing table, or available through a routing protocol (e.g., OLSR, Destination Sequence Distance Vector ("DSDV") routing protocol, or Source Tree Adaptive Routing ("STAR") protocol).

Next in 406-408, the network node determines the capacity (e.g., capacities c1 and c6 of FIG. 3) of each point-to-point communications link identified in the information obtained in 404, and the total number of network nodes n that share the capacity of each point-to-point communications link for broadcast data transmission to the network node. This determination can be made based on routing information contained in the pre-stored routing table, or available through the routing protocol.

In 410, the network node performs operations to compute a data transmission rate for each point-to-point communications link identified in the routing information obtained in 404 respectively using the capacities determined in 406 and the total numbers of network nodes determined in 408. The data transmission rate computation is defined above in relation to Mathematical Equation (1).

If only one data transmission rate was computed in 410, then method 400 continues with 414 where a decision is made as to whether a data transmission rate has been received from another network node. If not [414:NO], then 416 is performed where the network node advertises the locally computed data transmission rate to the other network nodes. The advertisement can be achieved using a broadcast message or a multicast message. Subsequently, 424 is performed where method 400 ends or other processing is performed (e.g., return to 402).

If so [414:YES], then the received data transmission rate is compared to the locally computed data transmission rate as shown by 418. If the received data transmission rate is greater than the locally computed data transmission rate [420:NO], then 416 is performed where the network node advertises the locally computed data transmission rate to the other network nodes. Subsequently, 424 is performed where method 400 ends or other processing is performed (e.g., return to 402).

If the received data transmission rate is equal to or lower than the locally computed data transmission rate [420:YES], then 422 is performed where the network node performs communications operations (e.g., transmit operations and/or receive operations) in accordance with the received data transmission rate. Subsequently, 424 is performed where method 400 ends or other processing is performed (e.g., return to 402).

If more than one data transmission rate was computed in 410 [412:YES], then method 400 continues with 426 of FIG. 4B. As shown in FIG. 4B, 426 involves comparing the locally computed data transmission rates to each other to identify which one has the lowest value. Thereafter, the network node waits a pre-defined period of time, as shown by 428. After expiration of the pre-defined period of time, a decision is made as to whether or not the network node has received a data transmission rate from another network node. If not [430:NO], then 432 is performed where the network nodes performs operations to advertise its lowest locally computed data transmission rate to the other network nodes. The network node also performs communications operations in accordance with the locally computed data transmission rate with the lowest value. Thereafter, 440 is performed where method 400 ends or other processing is performed (e.g., return to 402).

If so [430:YES], then 434 is performed where the received data transmission rate is compared to the lowest locally computed data transmission rate. If the received data transmission rate is greater than the lowest locally computed data transmission rate [436:NO], then method continues with 432 and 440 which are described above. In contrast, if the received data transmission rate is equal to or lower than the lowest locally computed data transmission rate [436:YES], then the network node performs operations in accordance with the received data transmission rate as shown by 438. Subsequently, 440 is performed where method 400 ends or other processing is performed (e.g., return to 402).

Figure 5:
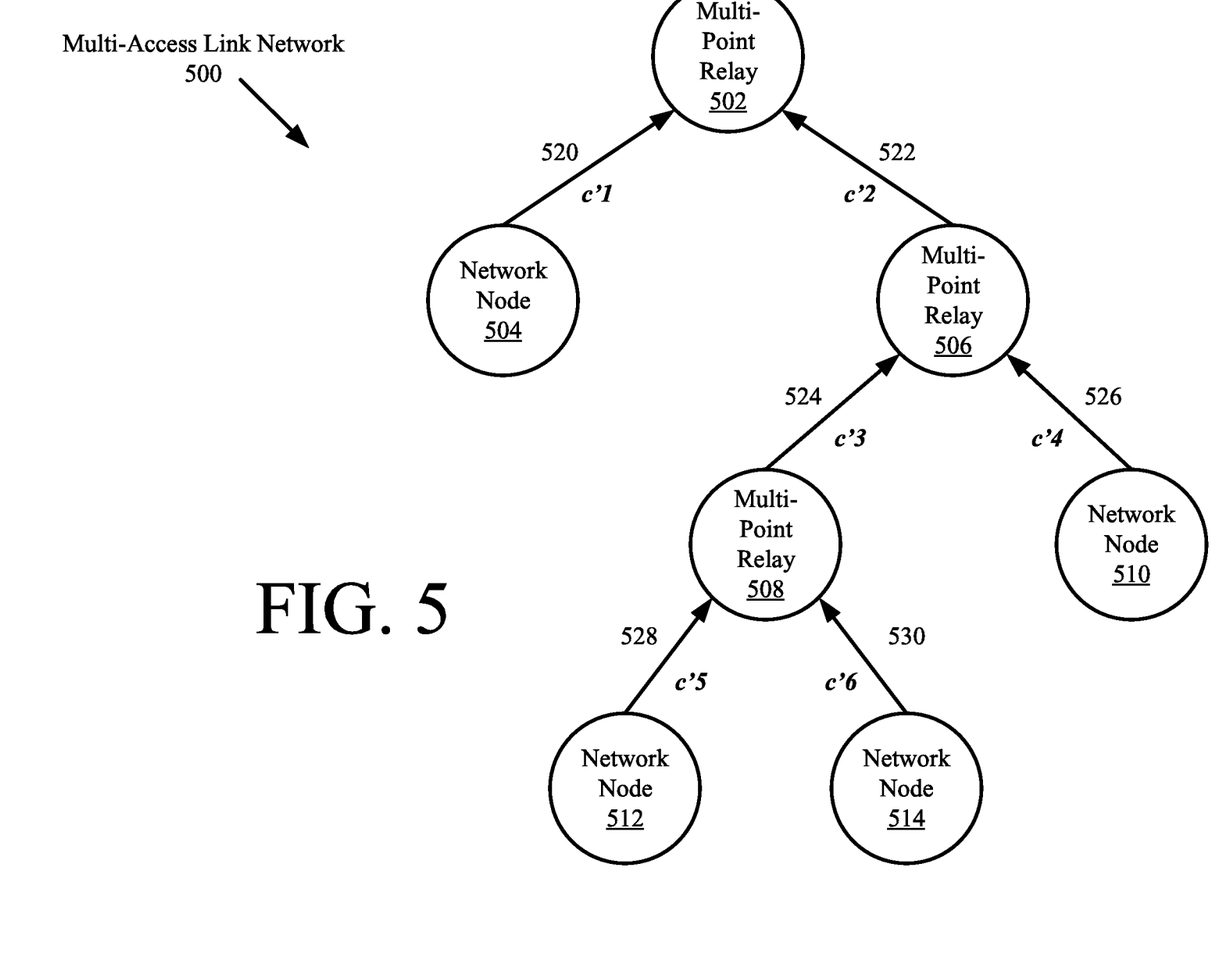
FIG. 5 is an illustration of an ad hoc network with a multi-access network configuration.

Referring now to FIG. 5, there is provided an illustration of an ad hoc network 500 with a multi-access link configuration. Network nodes 502, 506, 508 are MPRs. MPRs are well known in the art, and therefore will not be described herein. Network nodes 504, 510-514 are devices other than MPRs. Network nodes 502-514 are the same as or similar to network node 200 of FIG. 2. As such, the discussion provided above in relation to network node 200 is sufficient for understanding network nodes 502-514 of FIG. 5.

In some scenarios, the OLSR protocol is used in the selection of the MPRs. Each MPR forwards broadcast packets if and only if the arriving packet's last hop is in the MPR's selector set and the packet has not been received previously. An MPR selector set comprises identifiers for network nodes that are communicatively coupled to the MPR via a communications link without any intermediary network nodes. For a network with one MPR (e.g., MPR #1), the set of network nodes sharing this MPR is equal to {MPR #1, MPR #1's selector set}. For a network with multiple MPRs, an MPR can have other MPRs in its selector set. In this case, the set of network nodes sharing an MPR becomes an expanded selector set that includes the selector sets of other relevant MPRs.

In the scenario of FIG. 5, network nodes 502 and 504 are communicatively coupled to each other via a communications link 520. Network nodes 502 and 506 are communicatively coupled to each other via communications link 522. Network nodes 506 and 508 are communicatively coupled to each other via communications link 524. Network nodes 506 and 510 are communicatively coupled to each other via communications link 526. Network nodes 508 and 512 are communicatively coupled to each other via communications link 528. Network nodes 508 and 514 are communicatively coupled to each other via communications link 530.

The MPR selector set for nodes sharing the capacity of MPR 502 is {MPR 502, network node 504, network node 506}. The MPR selector set for nodes sharing the capacity of MPR 506 is {MPR 506, network node 502, network node 508, network node 510}. The MPR selector set for nodes sharing the capacity of MPR 508 is {MPR 508, network node 506, network node 512, network node 514}.

Since network node 506 is an MPR and network node 508 is an MPR contained in the selector set of MPR 506, the expanded selector set for nodes sharing the capacity of MPR 502 is {MPR 502, network node 504, MPR 506, MPR 508, network node 510, network node 512, network node 514}. Thus, seven network nodes share the capacity of MPR 502.

Since network nodes 502 and 508 are MPRs, the expanded selected set for MPR 506 is {MPR 506, MPR 502, network node 504, MPR 508, network node 510, network node 512, network node 514}. Thus, seven network nodes share the capacity of MPR 506.

Since network node 506 is an MPR and network node 502 is an MPR in the selector set for network node 506, the expanded selector set for network nodes sharing the capacity of MPR 508 is {MPR 508, MPR 502, network node 504, MPR 506, network node 510, network node 512, network node 514}. Thus, seven network nodes share the capacity of MPR 506.

Each of the MRPs 502, 506, 508 advertises its selector set and its minimum capacity to the other network nodes via a control message. Since MPR 502 is connected to other network nodes 504, 506 via communications links 520 and 522, it has two capacities c'1 and c'2 associated therewith. MPR 502 advertises the capacity with the lowest value (e.g., capacity c'1) along with its selector set. Since MPR 506 is connected to other network nodes 502, 508 and 510 via communications links 522, 524 and 526, it has three capacities c'2, c'3 and c'4 associated therewith. MPR 506 advertises the capacity with the lowest value (e.g., capacity c'4) along with its selector set. Since MPR 508 is connected to other network nodes 506, 512 and 514 via communications links 524, 528 and 530, it has three capacities c'3, c'5 and c'6 associated therewith. MPR 508 advertises the capacity with the lowest value (e.g., capacity c'5) along with its selector set.

Each network node 502-514 is configured to compute data transmission rates using the selector sets and minimum capacities advertised by the MPRs 502, 506 and 508. Routing table information may also be used to deduce this information at each of the network nodes. The lowest valued data transmission rate is selected by the network node as the sustainable data rate for the multi-access link network 500.

The data transmission rate is related to the minimum capacity of the respective MPR and the number of network nodes sharing the communications link associated with the minimum capacity. Thus, the data transmission rate computation for a given communications link is defined by the following Mathematical Equation (2).

$$dtr_{min} = c_{min}/n \qquad (2)$$

where $dtr_{min}$ represents the minimum data transmission rate for a given MPR, $c_{min}$ represents a minimum communications link capacity for the given MPR, and n represents the number of network nodes that share the capacity of the communications link associated with $c_{min}$.

The following TABLE 2 shows the data transmission rate computations for the multi-access link network 500.

TABLE 2

| MPR | Link | Min Capacity | Number of Nodes Sharing Capacity | dtr computation |
|---|---|---|---|---|
| 502 | 520 | c'1 | 7 | $dtr_{min} = c'1/7$ |
| 506 | 526 | c'4 | 7 | $dtr_{min} = c'4/7$ |
| 508 | 528 | c'5 | 7 | $dtr_{min} = c'5/7$ |

Once a network node completes its computation of the data transmission rate for all MPRs in the network, it compares the results to each other to identify which data transmission rate value is the lowest data transmission rate value $dtr_{lowest}$. The identified data transmission rate value $dtr_{lowest}$ is then adopted by the network node. In effect, the network node performs communications operations in accordance with $dtr_{lowest}$. This data transmission rate $dtr_{lowest}$, once adopted by the network nodes, will deliver minimal packet loss and delay for this high priority traffic within the prevailing network topology.

Notably, the number of network nodes sharing the capacities of MPRs 502, 506 and 508 are the same (i.e., 7) in FIG. 5. This is not the case in other scenarios. Therefore, an alternative scenario in which a different number of network nodes sharing capacities of multiple MPRs is show in FIG. 6.

Figure 6:
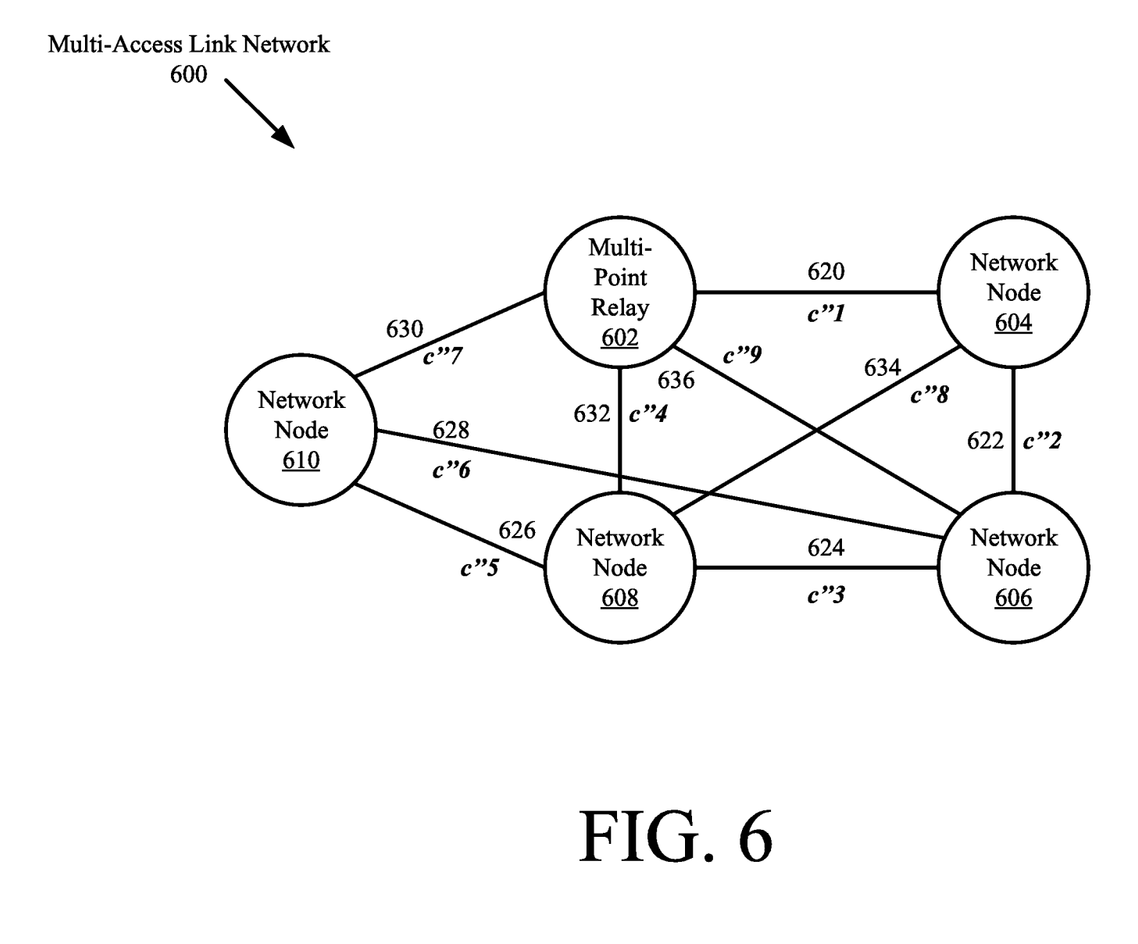
FIG. 6 is an illustration of an ad hoc network with another multi-access network configuration.

Referring now to FIG. 6, there is provided an illustration of an ad hoc network 600 with a multi-access link configuration. Network nodes 602 is an MPR. MPRs are well known in the art, and therefore will not be described herein. Network nodes 604, 606, 608, 610 are devices other than MPRs, such as radios. Network nodes 602-610 are the same as or similar to network node 200 of FIG. 2. As such, the discussion provided above in relation to network node 200 is sufficient for understanding network nodes 602-610 of FIG. 6.

In the scenario of FIG. 6, network nodes 602 and 604 are communicatively coupled to each other via a communications link 620. Network nodes 602 and 606 are communicatively coupled to each other via communications link 636. Network nodes 602 and 608 are communicatively coupled to each other via communications link 633. Network nodes 602 and 610 are communicatively coupled to each other via communications link 630. Network nodes 604 and 606 are communicatively coupled to each other via communications link 622. Network nodes 604 and 608 are communicatively coupled to each other via communications link 634. Network nodes 606 and 608 are communicatively coupled to each other via communications link 624. Network nodes 606 and 610 are communicatively coupled to each other via communications link 628. Network nodes 608 and 610 are communicatively coupled to each other via communications link 626.

The MPR selector set for nodes sharing the capacity of MPR 602 is {MPR 602, network node 604, network node 610}. Since neither network nodes 604 and 610 are MPRs, there is no expanded selector set for MPR 602. Thus, there are three network nodes share the capacity of MPR 602. Notably, nodes 602, 604 and 606 have direct connectivity with all other network nodes, and therefore packets from these nodes do not need to be relayed by any other node. Thus, the selector set of MPR 602 does not include network nodes 606, 608. Since network nodes 604 and 610 have no direct connectivity, MPR 602 is relaying for these nodes.

MRP 602 advertises its selector set and its minimum capacity to the other network nodes via a control message. Since MPR 602 is connected to other network nodes 604, 606, 608, 610 via communications links 620, 636, 632, 630, it has two capacities c"1, c"9, c"4, c"7 associated therewith. MPR 602 advertises the capacity with the lowest value (e.g., capacity c"9) along with its selector set.

Each network node 602-610 is configured to compute data transmission rates using the selector sets and minimum capacities advertised by the MPR 602. Routing table information may also be used to deduce this information at each of the network nodes. The lowest valued data transmission rate is selected by the network node as the sustainable data rate for the multi-access link network 600.

The data transmission rate is related to the minimum capacity of the respective MPR and the number of network nodes sharing the communications link associated with the minimum capacity. Thus, the data transmission rate computation for a given communications link is defined by the above provided Mathematical Equation (2). The following TABLE 3 shows the data transmission rate computations for the multi-access link network 600.

TABLE 3

| MPR | Link | Min Capacity | Number of Nodes Sharing Capacity | dtr computation |
|---|---|---|---|---|
| 602 | 636 | c"9 | 3 | $dtr_{min} = c"9/3$ |

Since there is only one MPR in network 600, $dtr_{min}$ is considered the lowest data transmission rate value $dtr_{lowest}$. As such, $dtr_{min}$ is adopted by the network node. In effect, the network node performs communications operations in accordance with $dtr_{min}$. This data transmission rate $dtr_{min}$, once adopted by the network nodes, will deliver minimal packet loss and delay for this high priority traffic within the prevailing network topology.

Figure 7:
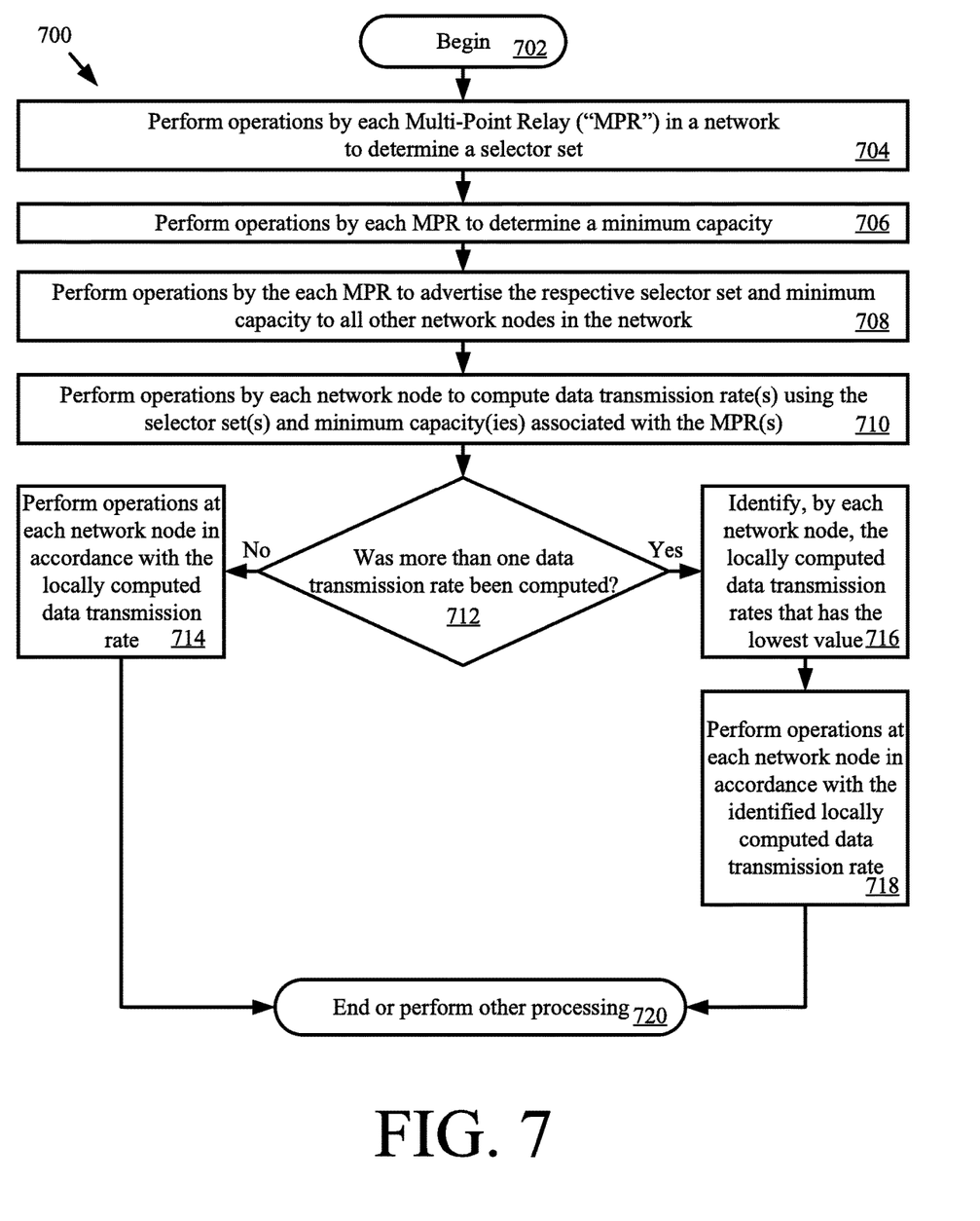
FIG. 7 provides a flow diagram of an illustrative method for operating the ad hoc network with the multi-access network configuration of FIGS. 5 and 6.

Referring now to FIG. 7, there is provided a flow diagram for an illustrative method 700 for operating the ad hoc network (e.g., network 500 of FIG. 5 or 600 of FIG. 6) with a multi-access link network configuration. Method 700 may be performed each time a network node is added to the network, removed from the network, or a communications link failures occurs.

Method 700 begins with 702 and continues with 704 where each MPR (e.g., MPRs 502, 506, 508 of FIG. 5 or 604, 610 of FIG. 6) of the ad hoc network perform operations to determine a selector set. Each MPR also performs operations to determine a minimum capacity therefore (e.g., capacity c'1, c'4, c'5 of FIG. 5 or capacity c"2, c"6 of FIG. 6), as shown by 706. In 708, each MPR advertises the respective selector set and minimum capacity to all other network nodes in the network (e.g., network nodes of 502-514 FIG. 5 or 602-612 of FIG. 6).

Next, each network node computes data transmission rate(s) in 710 using the selector set(s) and minimum capacity(ies) associated with the MPR(s). If only one data transmission rate was computed in 710 [712:NO], then communications operations are performed in 714 by each network node in accordance with the locally computed data transmission rate. Subsequently, 720 is performed where method 700 ends or other processing is performed (e.g., return to 704).

If more than one data transmission rate was computed in 710 [712:YES], then operations are performed in 716 by each network node to identify the locally computed data transmission rate that has the lowest value. In 718, each network node performs communications operations in accordance with the locally computed data transmission rate which was identified in 716. Subsequently, 720 is performed where method 700 ends or other processing is performed (e.g., return to 704).

Although the present solution has been illustrated and described with respect to one or more implementations, equivalent alterations and modifications will occur to others skilled in the art upon the reading and understanding of this specification and the annexed drawings. In addition, while a particular feature of the present solution may have been disclosed with respect to only one of several implementations, such feature may be combined with one or more other features of the other implementations as may be desired and advantageous for any given or particular application. Thus, the breadth and scope of the present solution should not be limited by any of the above described embodiments. Rather, the scope of the present solution should be defined in accordance with the following claims and their equivalents.

What is claimed:

1. A method for operating a network, comprising:
   determining, by a first network node, a capacity of each communications link of a plurality of communications links on which the first network node is configured to receive data from second network nodes;
   determining, by the first network node, a total number of network nodes that share the capacity of each said communications link of the plurality of communications links;
   computing, by the first network node, first data transmission rates for the plurality of communications links using the capacities and the total numbers of network nodes, respectively;
   comparing, by the first network node, the first data transmission rates to each other to determine which data transmission rate has a lowest value; and
   performing communication operations by the first network node in accordance with the data transmission rate determined to have the lowest value of the first data transmission rates.

2. The method according to claim 1, further comprising determining whether the first network node received a second data transmission rate from one of the second network nodes within a given period of time.

3. The method according to claim 2, further comprising advertising the data transmission rate to the second network nodes, when a determination is made that the first network node did not receive a second data transmission rate from one of the second network nodes within the given period of time.

4. The method according to claim 3, further comprising performing communication operations by the second network nodes in accordance with the data transmission rate that was advertised by the first network node.

5. The method according to claim 1, further comprising receiving by the first network node a second data transmission rate sent from one of the second network nodes.

6. The method according to claim 5, further comprising comparing the second data transmission rate to the data transmission rate determined to have the lowest value of said first data transmission rates.

7. The method according to claim 6, further comprising performing communications operations by the first network node in accordance with the second data transmission rate when the second data transmission rate is lower than the data transmission rate.

8. The method according to claim 6, wherein the communications operations are performed by the first network node in accordance with the data transmission rate when the second data transmission rate is greater than the data transmission rate.

9. The method according to claim 1, wherein the plurality of communications links comprise point-to-point communications links.

10. A method for operating a network node, comprising:
    determining, by a first network node, a capacity of a communications link on which the first network node is configured to receive data from a second network node;
    determining, by the first network node, a total number of network nodes that share the capacity of the communications link;
    computing, by the first network node, a first data transmission rate for the communications link using the capacity and the total number of network nodes that share the capacity of the communications link;
    receiving, at the first network node, a second data transmission rate sent from the second network node or a third network node;
    comparing the first data transmission rate to the second data transmission rate; and
    performing communication operations by the first network node (A) in accordance with the first data transmission rate when results of the comparing indicate that the first data transmission rate is lower than the second data transmission rate, or (B) in accordance with the second data transmission rate when results of the comparing indicate that the first data transmission rate is greater than the second data transmission rate.

11. The method according to claim 10, wherein the communications link is a point-to-point communications link.

12. A network node, comprising:
    a processor;
    a non-transitory computer-readable storage medium comprising programming instructions that are configured to cause the processor to implement a method for operating the network node, wherein the programming instructions comprise instructions to:
    determine a capacity of each communications link of a plurality of communications links on which the network node is configured to receive data from other network nodes;
    determine a total number of network nodes that share the capacity of each said communications link of the plurality of communications links;
    compute first data transmission rates for the plurality of communications links using the capacities and the total numbers of network nodes, respectively;
    compare the first data transmission rates to each other to determine which data transmission rate has a lowest value; and
    cause communication operations to be performed in accordance with the data transmission rate determined to have the lowest value of the first data transmission rates.

13. The network node according to claim 12, wherein the programming instructions further comprise instructions to determine whether the network node received a second data transmission rate from one of the other network nodes within a given period of time.

14. The network node according to claim 13, wherein the programming instructions further comprise instructions to cause the data transmission rate to be communicated to the other network nodes, when a determination is made that the network node did not receive a second data transmission rate from one of the other network nodes within the given period of time.

15. The network node according to claim 13, wherein communication operations are performed by the other network nodes in accordance with the data transmission rate that was advertised by the first network node.

16. The network node according to claim 12, wherein the programming instructions further comprise instructions to receive a second data transmission rate sent from one of the other network nodes.

17. The network node according to claim 16, wherein the programming instructions further comprise instructions to compare the second data transmission rate to the data transmission rate determined to have the lowest value of said first data transmission rates.

18. The network node according to claim 17, wherein the programming instructions further comprise instructions to cause communications operations to be performed by the network node in accordance with the second data transmission rate when the second data transmission rate is lower than the data transmission rate.

19. The network node according to claim 17, wherein the communications operations are performed by the network node in accordance with the data transmission rate when the second data transmission rate is greater than the data transmission rate.

20. The network node according to claim 12, wherein the plurality of communications links comprise point-to-point communications links.

21. A network node, comprising:
a processor;
a non-transitory computer-readable storage medium comprising programming instructions that are configured to cause the processor to implement a method for operating the network node, wherein the programming instructions comprise instructions to:
determine a capacity of a communications link on which the network node is configured to receive data from another network node;
determine a total number of network nodes that share the capacity of the communications link;
compute a first data transmission rate for the communications link using the capacity and the total number of network nodes that share the capacity of the communications link;
receive a second data transmission rate sent from the another network node;
compare the first data transmission rate to the second data transmission rate; and
perform communication operations by the network node (A) in accordance with the first data transmission rate when results of the comparing indicate that the first data transmission rate is lower than the second data transmission rate, or (B) in accordance with the second data transmission rate when results of the comparing indicate that the first data transmission rate is greater than the second data transmission rate.

22. The network node according to claim 21, wherein the communications link is a point-to-point communications link.

23. A method for operating a network, comprising:
obtaining, by a network node, selector sets for a plurality of Multi-Point Relays ("MPRs") in the network, each said selector set comprising an identifier for a respective first MPR of the plurality of MPRs and identifiers for network nodes that are communicatively coupled to the respective first MPR via communications links without any intermediary network nodes;
obtaining, by the network node, minimum capacities for the plurality of MPRs;
computing, by the network node, data transmission rates using the selector sets and the minimum capacities, respectively;
comparing the data transmission rates to each other to determine which data transmission rate has a lowest value; and
performing communications operations by the network node in accordance with the data transmission rate determined to have the lowest value.

24. The method according to claim 23, further comprising receiving by the network node a respective one of said minimum capacities along with a respective one of said selector sets from each of said MPRs.

25. The method according to claim 23, wherein each said data transmission rate comprises a ratio between a respective one of the minimum capacities and a total number of network nodes contained in a respective one of the selector sets.

26. The method according to claim 23, wherein at least a first selector set of the selector sets comprises an identifier for a second MPR.

27. The method according to claim 26, wherein the first selector set is expanded to include identifiers for network nodes that are communicatively coupled to the second MPR via communications links without any intermediary network nodes.

28. The method according to claim 27, wherein a first data transmission rate of said data transmission rates comprises a ratio between a respective one of the minimum capacities and a total number of network nodes contained in the first selector set which has been expanded.

29. A network node, comprising:
a processor;
a non-transitory computer-readable storage medium comprising programming instructions that are configured to cause the processor to implement a method for operating the network node, wherein the programming instructions comprise instructions to:
obtain selector sets for a plurality of Multi-Point Relays ("MPRs") in the network, each said selector set comprising an identifier for a respective first MPR of the plurality of MPRs and identifiers for network nodes that are communicatively coupled to the respective first MPR via communications links without any intermediary network nodes;
obtain minimum capacities for the plurality of MPRs;
compute data transmission rates using the selector sets and the minimum capacities, respectively;
compare the data transmission rates to each other to determine which data transmission rate has a lowest value; and
cause communications operations to be performed by the network node in accordance with the data transmission rate determined to have the lowest value.

30. The network node according to claim 29, wherein the programming instructions further comprise instructions to receive a respective one of said minimum capacities along with a respective one of said selector sets from each of said MPRs.

31. The network node according to claim 29, wherein each said data transmission rate comprises a ratio between a respective one of the minimum capacities and a total number of network nodes contained in a respective one of the selector sets.

32. The network node according to claim 29, wherein at least a first selector set of the selector sets comprises an identifier for a second MPR.

33. The network node according to claim 32, wherein the first selector set is expanded to include identifiers for network nodes that are communicatively coupled to the second MPR via communications links without any intermediary network nodes.

34. The method according to claim 33, wherein a first data transmission rate of said data transmission rates comprises a ratio between a respective one of the minimum capacities and a total number of network nodes contained in the first selector set which has been expanded.

* * * * *